Nov. 10, 1970    J. MOSETICH ET AL    3,538,673
FASTENER INSERTING MACHINE
Filed March 20, 1968    7 Sheets-Sheet 1
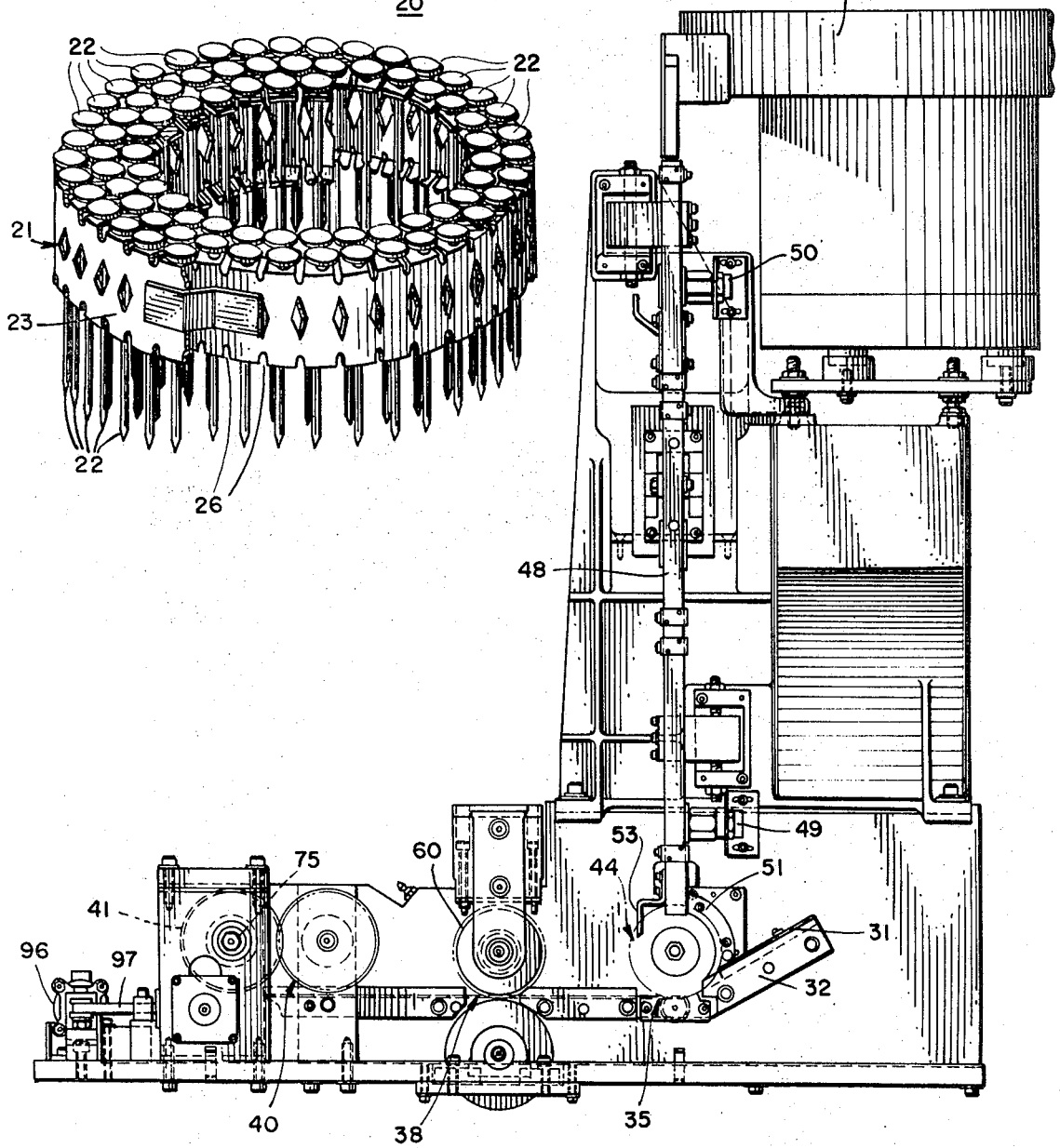
INVENTORS:
RONALD J. MOSETICH
JOSEPH MOSETICH
BY: *Macey, Kolehmainen, Rathburn & Wyss*
ATT'YS

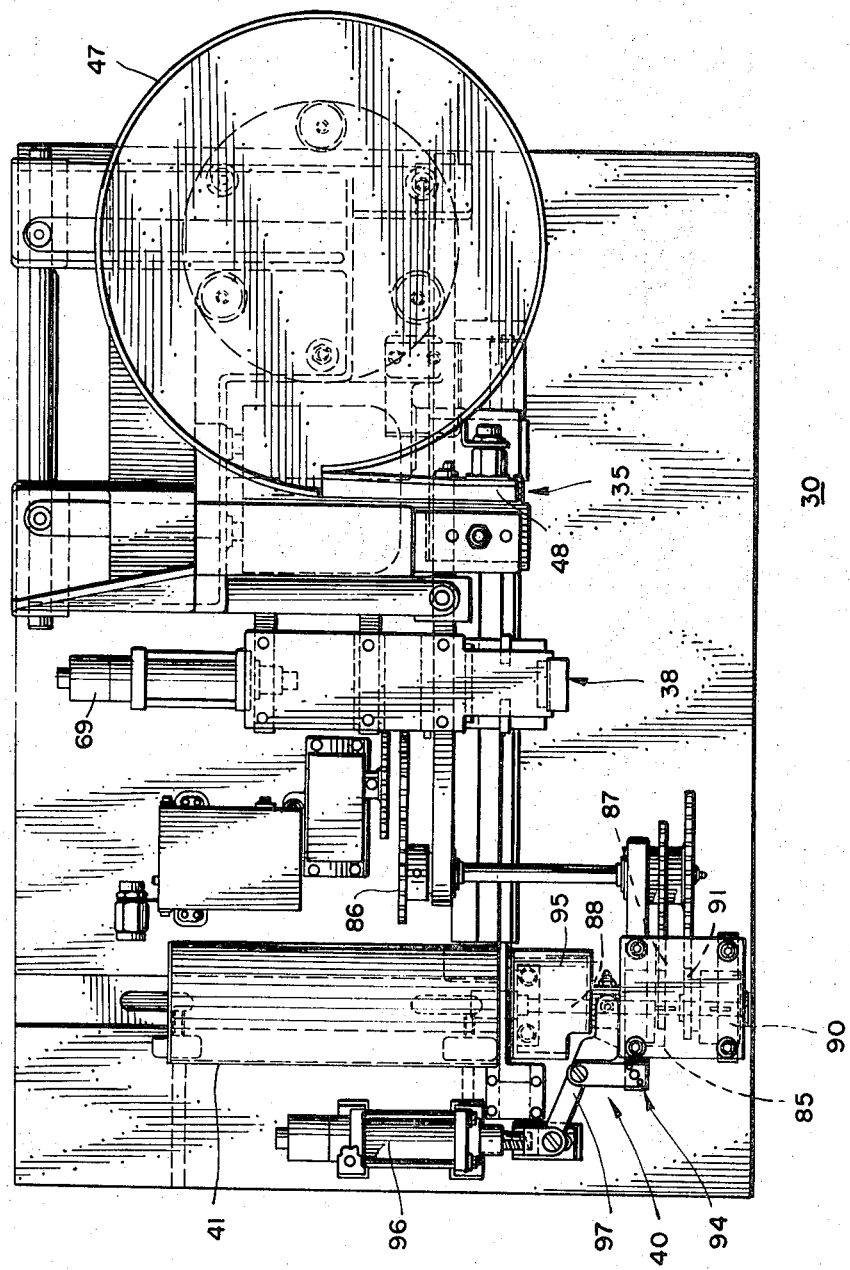

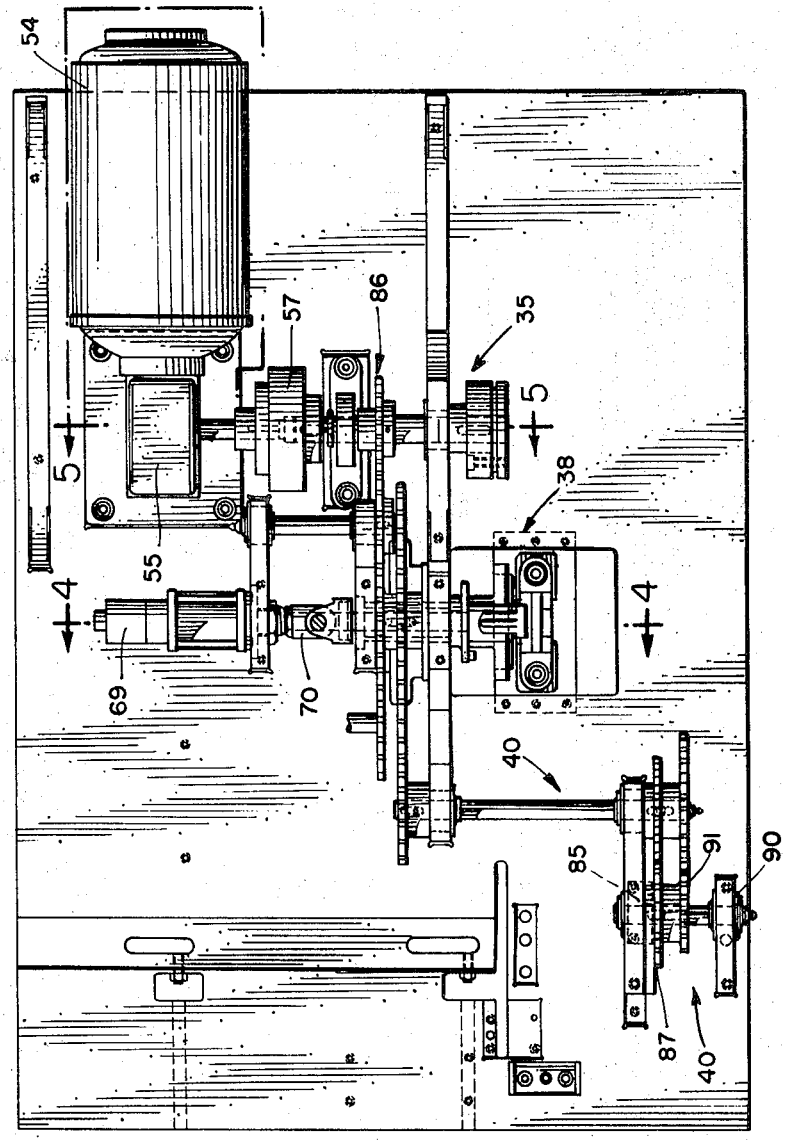

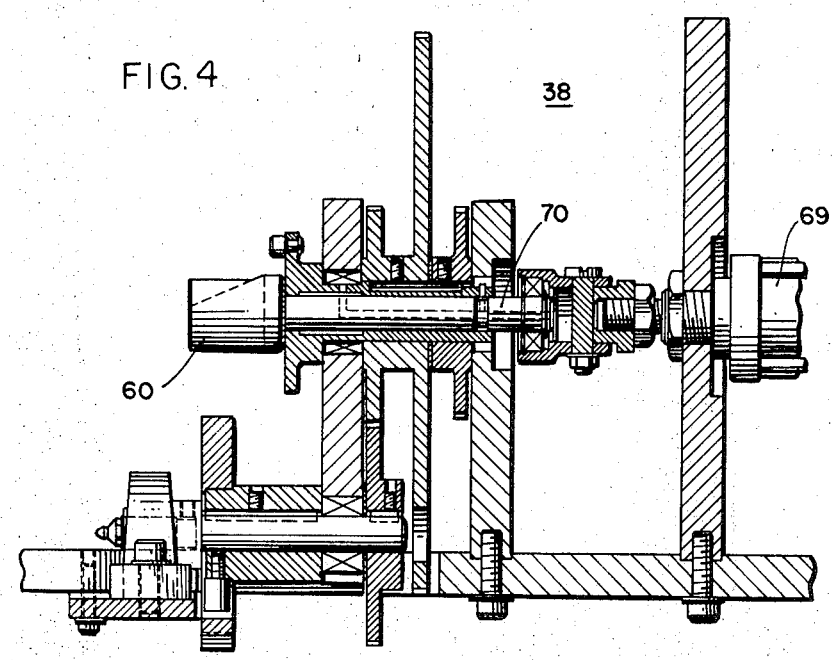
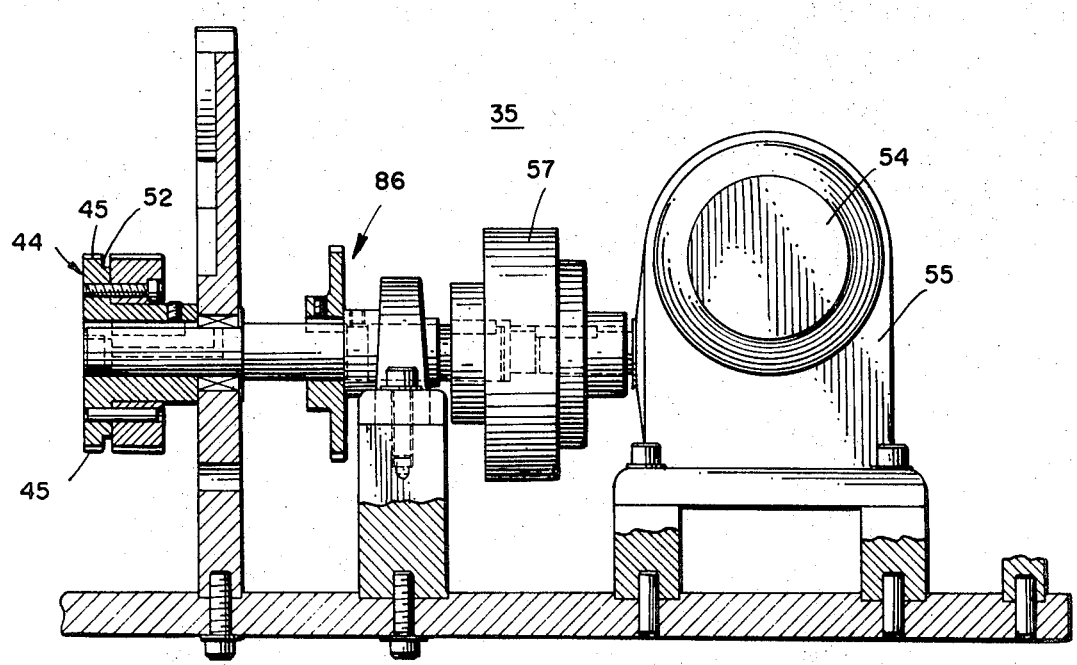

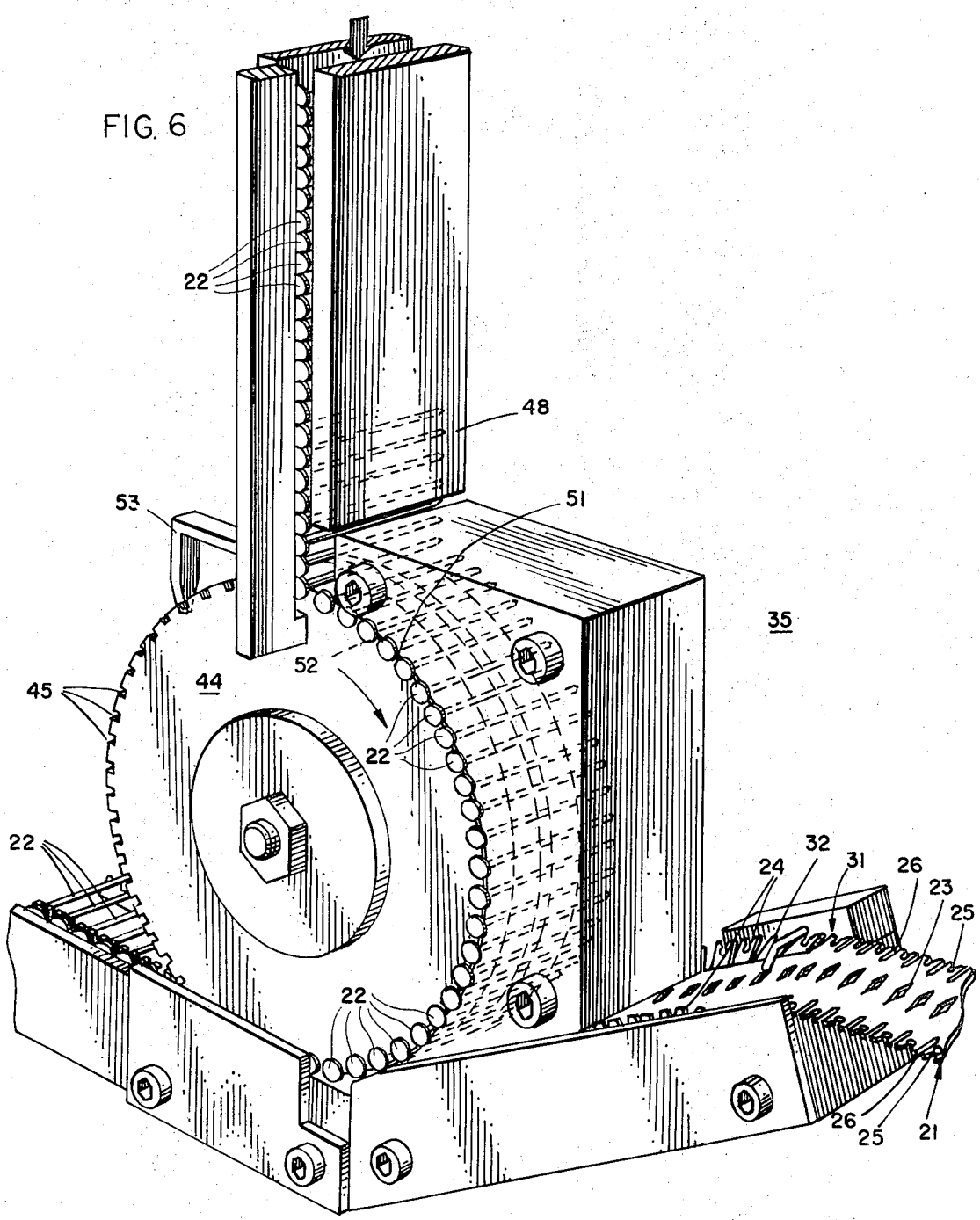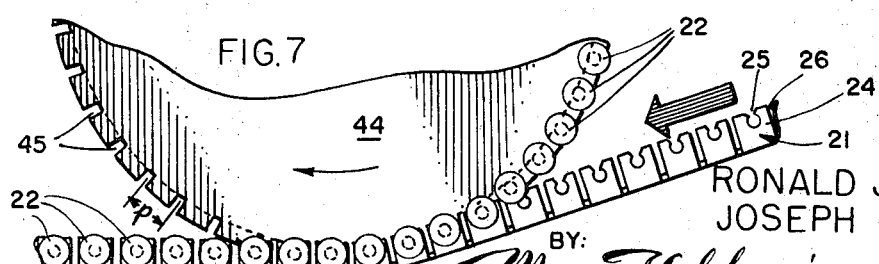

Nov. 10, 1970    J. MOSETICH ET AL    3,538,673
FASTENER INSERTING MACHINE
Filed March 20, 1968    7 Sheets-Sheet 6

INVENTORS:
RONALD J. MOSETICH
JOSEPH MOSETICH
BY:
ATT'YS

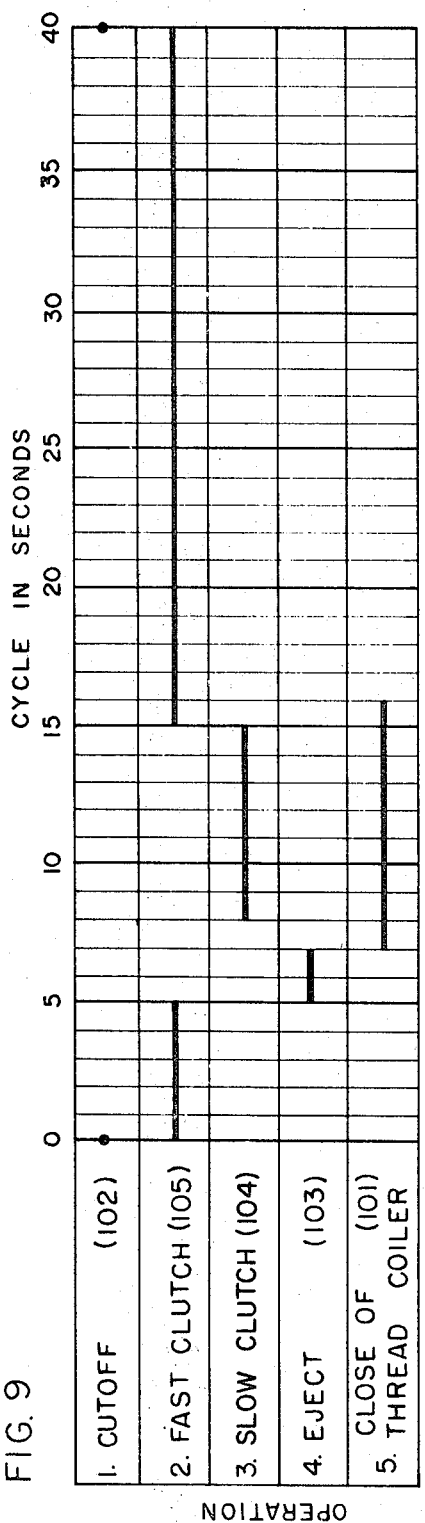
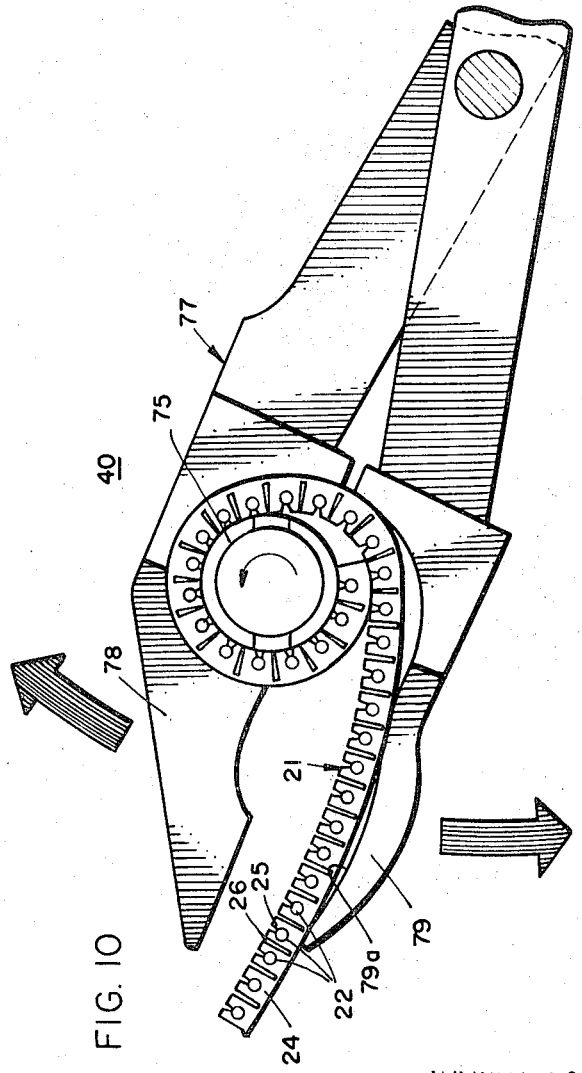

United States Patent Office 3,538,673
Patented Nov. 10, 1970

3,538,673
FASTENER INSERTING MACHINE
Joseph Mosetich, Westchester, and Ronald J. Mosetich, Lombard, Ill., assignors to Fastener Corporation, Franklin Park, Ill., a corporation of Illinois
Filed Mar. 20, 1968, Ser. No. 714,666
Int. Cl. B65b 63/04
U.S. Cl. 53—118     13 Claims

ABSTRACT OF THE DISCLOSURE

There is provided an apparatus for inserting fasteners, such as common nails and the like, into a carrier strip to provide a cartridge or bundle of fasteners. The fasteners are inserted into fastener carrying grooves of the carrier strips by means of a transfer wheel having peripheral grooves, each receiving the shank of a fastener, and driven to align with the respective fastener driving grooves in the carrier strip. The carrier strip is then coiled and cut to provide the complete bundle.

---

This invention relates to a fastener inserting machine, particularly to a machine for forming bundles of fasteners, each fastener having a shank, such as common nails and the like, supported on a coiled carrier strip. The bundle of fasteners is adapted for use as a magazine in a fastener driving tool, such as the known pneumatic or electrical fastener driving tools.

There has been a growing demand for a fastener driving device which will drive a fastener of the type wherein there is but a single leg or shank, as in a common nail, provided with a suitable head. One such fastener driving device is described and illustrated in the copending application, Ser. No. 637,510, filed on May 10, 1967, by Gallee et al., which utilizes a bundle of fasteners of the type illustrated in the copending application of Joseph Mosetich, now Pat. No. 3,450,255, granted June 15, 1969, both assigned to the same assignee as the present invention. The Mosetich application discloses a bundle of individual fasteners such as nails carried on a coiled carrier strip. The carrier strip is formed of a ribbon of flexible material, such as polyethylene, and includes a web having peripheral flanges formed at right angles thereto into generally channel shape. The marginal edges are formed with pairs of slots, the slots of each pair being formed at the opposed marginal edges to define a fastener carrying groove. A suitable fastener, such as a common nail, is resiliently held in the respective fastener carrying grooves. The bundle of fasteners is adapted for automatic feeding into a fastener driving device.

Since such fasteners are used in large volumes, it is desirable to form the bundle of fasteners rapidly and at low cost.

Accordingly, one object of the present invention is to provide a new and improved apparatus for forming bundles of fasteners such as common nails supported on a carrier strip.

A further object of the present invention is to provide an apparatus for transferring and assembling fasteners such as common nails with a carrier strip.

A further object of the present invention is to provide a new and improved apparatus for transferring nails from a supply mechanism to a carrier strip.

Yet a further object of the present invention is to provide a new and improved apparatus for coiling an elongated strip or bundle consisting of a carrier strip and fasteners such as common nails.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a new and improved apparatus for inserting fasteners into a carrier strip and forming coiled bundles of assembled carrier strips. The fasteners are of the type having a shank, such as common nails and the like, and are supported on a carrier strip of the type having marginal edges transversely of its web in general channel shape. The carrier strip is fed to the fastener inserting apparatus in the form of a flat ribbon of flexible material, such as polyethylene, and means are provided along the feed track for forming the marginal edges of the flat blank into the general channel shape to provide successive pairs of upstanding opposed marginal slots, each defining a fastener carrying groove.

Transfer means are provided for inserting the nails into the carrier strip. The transfer means include a transfer wheel provided with peripheral grooves for receiving the shank of a fastener, and the transfer wheel is positioned with its peripheral edge passing between the upstanding marginal edges of the carrier strip in the feed track with the peripheral grooves axially aligned with respective fastener receiving grooves of the carrier strip. Thus, the peripheral grooves have a pitch approximately equal to the distance between adjacent fastener drive-carrying grooves. Fastener supply means having a supply chute is provided for supplying the fasteners to the transfer wheel transversely aligned thereto and discharging by gravity at the transfer wheel.

A coiling mandrel is provided for coiling the strip and includes a plurality of peripheral grooves for receiving the shanks of fasteners assembled in a carrier strip which is fed tangentially into engagement wth a mandrel. A clamp closes around the mandrel at the beginning of a feeding operation with the jaws of the clamps being biased toward each other. After one complete turn of the assembled carrier strip, the jaws are opened rendering the same ineffective. Means are provided for cutting an assembled carrier strip and for quickly winding the remaining portion thereof onto the coiling mandrel. The coiled bundle of fasteners may then be removed from the coiling mandrel.

For a better understanding of the present invention, reference may be had to the accompanying drawings wherein:

FIG. 1 is a front elevational view of the fastener inserting apparatus according to the present invention;

FIG. 2 is a top plan view of the fastener inserting apparatus;

FIG. 3 is a fragmentary top view illustrating the mechanical layout of the fastener inserting apparatus;

FIG. 4 is a fragmentary cross-sectional view of the cutoff mechanism of the fastener inserting apparatus, taken along line 4—4 of FIG. 3;

FIG. 5 is a cross sectional view of the fastener inserting apparatus illustrating the drive of the transfer wheel, taken along line 5—5 of FIG. 3;

FIG. 6 is a fragmentary perspective view of the transfer mechanism of the fastener inserting apparatus;

FIG. 7 is a fragmentary front elevational view of the fastener inserting mechanism illustrated with the front guard thereof removed;

FIG. 9 is a time chart illustrating the functional operation of the components of the fastener inserting apparatus according to the present invention;

FIG. 10 is a sectional view illustrating the beginning of a winding operation upon the winding mandrel;

FIG. 11 is an enlarged sectional view of the cutter mechanism for the carrier strip, illustrated in FIG. 4, and illustrated in a cutting position; and FIG. 12 illustrates a spirally coiled carrier strip bundle assembled with common nails in accordance with the present invention.

Figure 8:
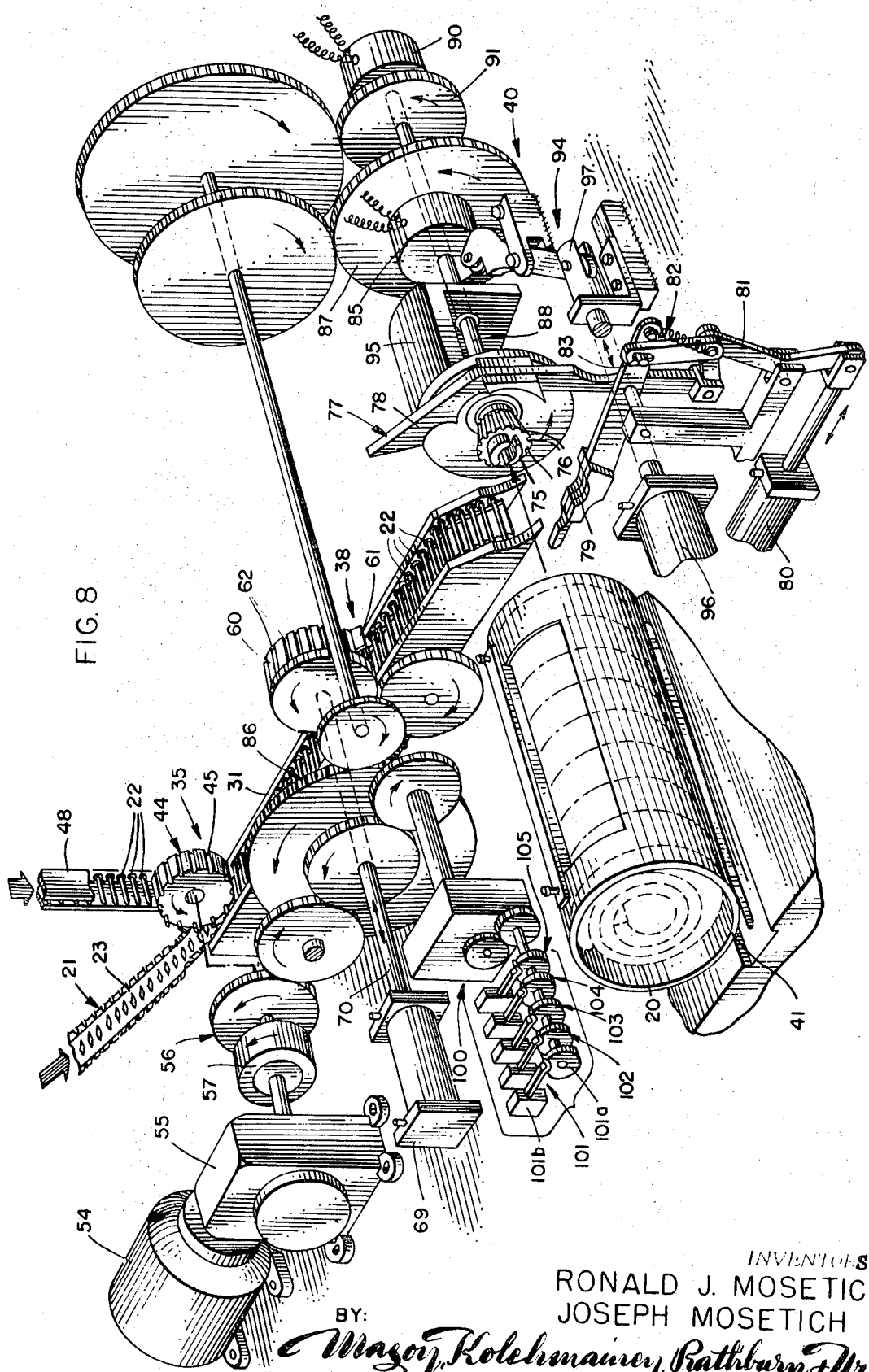
FIG. 8 is a perspective, somewhat schematic view of the gearing and drive mechanism of the fastener inserting apparatus.

Referring now to the drawings, and particularly to the assembled carrier strip as best illustrated in FIGS. 6, 7, 8, 10, and 12, there is illustrated a spirally coiled carrier strip or bundle 20 having a carrier 21 formed of a ribbon of flexible material such as polyethylene, and carrying a plurality of individual fasteners such as nails 22. The carrier 21 includes a web 23 having marginal edges or flanges 24 folded transversely of its web in general channel shape to provide pairs of opposed slots 25, the slots of each pair defining a fastener carrying groove. The flanges 24 may be slit between the slots 25, as illustrated at 26, to provide for coiling of the carrier strip without buckling thereof. Moreover, the respective slots 25 may be of generally keyhole shape to provide a resilient locking of the nails 22 within the fastener carrying grooves.

In accordance with the present invention, there is provided a fastener inserting apparatus, generally illustrated at 30, for assembling the nails 22 with the carrier 21. As best illustrated in FIGS. 1 and 6, the fastener inserting apparatus is provided with a carrier track 31 passing along a folding and inserting block 32 which is effective to form or fold the marginal edges of a flat carrier 21 to provide the flanges 24. The carrier 21 then passes past a nail transfer mechanism, generally illustrated as 35 where the nails 22 are inserted into the pairs of slots 25. The carrier strip 21 then passes through a cutoff mechanism, generally illustrated at 38, where the carrier strip 21 is severed at specific intervals to provide a desired length in the bundle 20. Subsequently thereto, the carrier 21 is rolled on a coiling mechanism, generally illustrated at 40. Upon completion of coiling of each bundle, the bundle is pushed from the coiling mechanism into a tube assembly 41, best illustrated in FIG. 2.

NAIL TRANSFER MECHANISM

The nail transfer mechanism inserts the nails 22 into the slots 25 of the carrier 21 and is best illustrated in FIGS. 1, 5, 6, 7, and 8. As therein illustrated, the transfer mechanism 35 includes a transfer wheel 44 provided with arcuately spaced peripheral grooves 45 for receiving the shank of a fastener. The peripheral edge of the transfer wheel 44 extends into the open channel of the carrier strip 21 through the track 31 with each peripheral groove 45 aligning with a fastener carrying slot 25 of the carrier strip 21 so that the respective pitch $p$, FIG. 7, between adjacent grooves is equal to the distance between adjacent slots 25.

For supplying nails 22 to the transfer wheel 44, there is provided a feed system including a feeder bowl 47, FIG. 1, of the vibratory type designed to feed nails 22 in aligned position down through a chute assembly 48 in aligned position. The chute assembly discharges above and generally radially of the transfer wheel and is effective to supply nails to the transfer wheel by gravity each time that one of the peripheral grooves 45 moves across the discharge end of the chute 48. Thus, the transfer wheel 44 is continuously supplied with nails 22. A lower proximity switch 49 begins the operation of the vibrating feeder 47 whenever the level of nails in the chute assembly 48 falls below the level thereof; an upper proximity switch 50 stops the vibrating feeder bowl 47 whenever the level of nails in the chute assembly 48 is higher than the level of the upper switch thereof. An arcuate guide 51 extending from the discharge of the chute 48 around the nail carrying end of the transfer wheel 44 prevents accidental displacement or dropping of a nail 22 from a peripheral groove 45.

To prevent nails which may hang up in the transfer wheel 44 from re-entering and jamming the system, the transfer wheel 44 is provided with a circumferential groove 52, and an ejector 53 extends with a point thereof into the circumferential groove 52 to dislodge any nails 22 which may be carried back toward the chute assembly 48.

It will be understood that rotation of the transfer wheel 44 in a clockwise direction as viewed in FIGS. 1, 6, and 7 will be effective to lock a nail 22 into a respective one of the slots 25 as the nail and slot are brought together along the track of the carrier strip 21. Moreover, driving of the transfer wheel 44 in a clockwise direction will synchronously advance the carrier strip with the driving of the transfer wheel through engagement of the nails 22 in the slots 25.

Suitable means are provided for turning the transfer wheel 44 and, in the illustrated embodiment, includes a motor, such as an electric motor 54, connected through a gear reducer 55 and overload coupling or clutch 57 to the transfer wheel 44. Moreover, the motor 54 runs continuously so that the nails 22 are assembled in the carrier strip 21 at a uniform and continuous rate.

CUTOFF MECHANISM

The cutoff mechanism for severing the carrier 21 at desired positions is best illustrated in FIGS. 1, 2, 3, 4, 8, and 11. As therein illustrated, the cutoff mechanism 38 includes a cutoff wheel 60 having a cutoff blade 61, FIGS. 9 and 12, retractable within the cutoff wheel 60 or projectable therefrom. The driving wheel 60 contains a plurality of peripheral grooves 62 engageable with the assembled nails 22 in the carrier strip 21 to assure synchronous rotation with the movement of the carrier strip. As best illustrated in FIG. 11, the blade 61 is projectable upon axial movement of a cone-shaped actuator 64. Movement of the actuator 64 to the right, as viewed in FIG. 11, is effective to bear against a cam block 65 connected to the cutoff blade 61 through a shaft 66 to project the blade 61. The blade 61 is biased to its retracted position by a compression spring 67. Another compression spring 68 is effective to bias the actuator 64 to the left, as viewed in FIG. 11, so that the blade 61 is retracted. Movement of the actuator 64, and therefore of the blade 61, is under the control of an air cylinder 69 connected thereto through a suitable shaft 70.

COILING MECHANISM

After assembly of the nails 22 on the carrier strip 21, the carrier strip 21 passes to the coiling mechanism 40 best illustrated in FIGS. 1, 2, 8, and 10. As therein illustrated, the coiling mechanism 40 includes a coiling mandrel 75 provided with a plurality of peripheral grooves 76, FIG. 8, adapted for receiving the shanks of fasteners in the carrier strip. The carrier track 31 threads the assembled strip into tangential engagement with the mandrel whereby the shanks of the nails 22 enter the respective peripheral grooves. Once the carrier strip has been started by engagement with the coiling mandrel 75, a clamp 77 is effective to close around the mandrel to prevent disengagement of the carrier strip from the mandrel. To this end, there is provided a pair of clamp jaws 78 and 79, FIG. 10, adapted to generally conform to the shape of a single turn of coiled carrier strip. Moreover the lower one of the jaws 79 includes a guide portion 79a which aids in directing a free end of a carrier strip into tangential engagement with the mandrel 75. The jaws 78 and 79 of the clamp 77 are opened and closed by means of an air cylinder 80, FIG. 8, through a suitable linkage 81. However, the jaws 78 and 79 are spring-biased by a tension spring 82 through a lost motion connection 83 to provide for limiting opening of the jaws relative to each other against the return bias of the spring 82. Thus, as soon as somewhat more than one turn of the carrier strip 21 is coiled on the mandrel 75, the air cylinder 80 would be actuated from the position illustrated in FIG. 10 to an open position illustrated in FIG. 8, thereby to render the clamp 78 ineffective.

To provide for winding the carrier strip 21, there is provided a winding clutch 90, FIGS. 2 and 8, which when operative connects the mandrel to the motor 54 and gear reducer 55 through the suitable gear train 86 driving a fast or winding gear 91. When the clutch 90 is engaged, the mandrel 75 is driven at a slightly overdrive speed, the difference being taken up by slippage of the clutch 90. Thus, there is always a slight tension applied to the coiling carrier strip 21 to assure positive takeup. However, upon initial engagement of a carrier strip 21 with the coiling mandrel 75, it is desirable to slowly wind the beginning end of the carrier strip 21 onto the mandrel 75 to prevent slippage between the strip and mandrel. To this end, there is provided a slow drive clutch 85 operatively connected to a slow drive gear 87. When the slow drive clutch 85 is engaged, the slow drive gear 87 is driven by the gear train 86. The selective actuation of the winding clutch and slow drive clutch 90, 85 is controlled by the cycling of the fastener inserting apparatus 30.

To push a coiled bundle 20 of fasteners from the mandrel 75, there is provided a pusher assembly 94 including a pusher member 95 slidably mounted on the shaft 88 so that, upon actuation of an air cylinder 96 and actuating linkage 97, the pusher member 95 will move to the left, as viewed in FIG. 8, thereby to push a coiled bundle off the mandrel 75 and into the tube assembly 41.

OPERATION

From the above detailed description, the operation of the improved fastener inserting apparatus is believed to be clear. However, briefly, the operation and cycling of the fastener inserting apparatus 30 is controlled by a control assembly 100 synchronously driven by the gear train 86. The control assembly 100 includes a plurality of switch assemblies 101, 102, 103, 104, and 105, FIG. 9, each including a switch cam 101a, etc. and a switch 101b, etc. The switch assembly 101 is connected to actuate the air cylinder 80, controlling the closing of the clamp jaws 78. The switch assembly 102 is connected to actuate the air cylinder 69 controlling the cutoff mechanism 38. The switch assembly 103 is connected to operate the air cylinder 96 controlling the pusher assembly 94. The switch assemblies 104 and 105 are respectively connected to the slow clutch 85 and to the fast or winding clutch 90.

As illustrated in the cycle diagram of FIG. 10, beginning with the cutoff from one bundle 20, the switch 102 is operative to actuate the cutoff mechanism 38. At that time, the fast drive clutch 90 is effective, through the control of the switch assembly 105, to rapidly drive the bundle so that the completion of the coiling will take place very rapidly. As soon as the winding is complete, as indicated at the five second mark of the cycle diagram, the fast clutch 90 will be rendered inoperative and the pusher assembly 94 will be actuated to push or eject a completed bundle 20 into the tube assembly 41. As soon as the pusher assembly has completed its eject cycle and return stroke, the clamp 77 will close, to the position illustrated in FIG. 10, so that the advance of the succeeding carrier strip 21 will be directed tangentially onto the mandrel 75. The slow clutch 85 will be rendered effective so as to complete a single winding of the assembled carrier strip 21. After a complete turn has been made onto the mandrel 75, the lower jaw 79 of the clamp 77 will be opened against the return bias of the tension spring 82 to permit the start of a second turn, as indicated in the range of about fourteen to sixteen seconds on the time chart of FIG. 10. Moreover, at this point the slow clutch 85 will be disengaged and the fast drive clutch 90 will be engaged, as indicated at the fifteen second mark of the time chart of FIG. 10, thereby slightly overdriving the shaft 88 by slippage of the clutch 90 to permit positive takeup of the assembled carrier strip 21. Of course as soon as a sufficient length of carrier strip 21 has passed under the cutoff mechanism 38, cutoff mechanism 38 will be again actuated, as indicated at the forty second mark of the time chart of FIG. 10 to cut the carrier strip 21 and to complete the cycle of operation.

It will be understood that the second cycle, as described, will commence immediately with a continued rapid windup of the severed carrier strip 21, thereby to complete the bundle 20.

The fastener inserting apparatus 30 is maintained synchronously in operation by the positive drive of the gears in the gear train 86 which positively drive the cams 101a, etc.

Moreover, it is understood that the nail inserting operation carried on by the nail transfer mechanism 35 operates continuously and repetitively to provide a continuous nail inserting process. The operation of the cutoff mechanism 38 takes place sporadically as determined by the length of carrier strip 21 which passes thereunder. Moreover, the coiling mechanism 40 actuates in step-by-step process through its cycle to provide complete cyclings of operation including the fast takeup, ejection, initial threading of a new carrier strip on the mandrel, and continued takeup of the new carrier strip.

Although the present invention has been described by reference to only a single embodiment thereof, it will be apparent that numerous modifications and embodiments will be devised by those skilled in the art which will fall within the true spirit and scope of the present invention.

What is claimed as new and desired to be secured by Letters Patent of the United States is:

1. Apparatus for forming bundles of fasteners each having a shank, such as common nails and the like, supported on a coiled carrier strip of the type having marginal edges transversely of its web in general channel shape with pairs of slots, the slots of each pair being formed in the opposed marginal edges to define a fastener carrying groove, said apparatus comprising:

track means for receiving a flat blank of carrier strip;
   forming means along said track means for forming the marginal edges of a flat blank of carrier strip into general channel shape providing a plurality of pairs of upstanding opposed marginal slots defining fastener carrying grooves;
   transfer means including a transfer wheel provided with peripheral grooves for receiving the shank of a fastener, said transfer wheel being positioned with its peripheral edge passing between the upstanding marginal edges of a carrier strip in said track means with said peripheral grooves axially alignable with respective fastener receiving grooves and said peripheral grooves having a pitch approximately equal to the distance between adjacent fastener carrying grooves;
   supply means for providing a supply of transversely aligned fasteners discharging at said transfer wheel;
   a coiling mandrel for assembled strip having a plurality of peripheral grooves for engaging shanks of fasteners in a carrier strip;
   track means for threading assembled strip into tangential engagement with said mandrel;
   clamp means closable around said mandrel including jaws spring biased toward each other;
   means for opening said jaws rendering the same ineffective;
   means for cutting an assembled carrier strip; and
   means for removing a coiled bundle of fasteners from said coiling mandrel.

2. Apparatus as set forth in claim 1 wherein said supply means includes a chute arranged vertically above said transfer wheel, and wherein said fasteners are discharged therefrom by gravity into the peripheral grooves.

3. Apparatus as set forth in claim 1 including an arcuate guide adjacent the periphery of said transfer wheel between said supply means discharge and its engagement with said carrier strip.

4. Apparatus as set forth in claim 1 including a tube assembly for receiving bundles of fasteners discharged from said coiling mandrel.

5. Apparatus for forming bundles of fasteners each having a shank, such as common nails and the like, supported on a coiled carrier strip having fastener carrying grooves, said apparatus comprising:
   track means for receiving carrier strip;
   chute means for providing a supply of transversely aligned fasteners;
   transfer means including a transfer wheel provided with peripheral grooves for receiving the shank of a fastener guide adjacent the periphery of said wheel, said transfer wheel being positioned with the peripheral grooves axially alignable with respective fastener carrying grooves in a carrier strip;
   means driving said transfer wheel; and
   coiling means for bundling an assembled carrier strip into a bundle of fasteners.

6. Apparatus for assembling fasteners, each having a shank, such as common nails and the like, with a carrier strip of general channel shape having pairs of slots, the slots of each pair being formed in the opposed legs to define a fastener carrying groove, said apparatus comprising:
   a transfer wheel provided with peripheral grooves for receiving the shank of a fastener;
   means driving said transfer wheel;
   chute means discharging at and extending generally radially of said transfer wheel for supplying fasteners to said transfer wheel wherein a fastener moves into each peripheral groove upon movement of said transfer wheel; and
   track means for guiding a carrier strip past said transfer wheel with the peripheral edge of said transfer wheel extending into the open channel of said carrier strip with each peripheral groove aligning with a fastener carrying groove of a carrier strip; said fasteners in said transfer wheel advancing said carrier strip synchronously with the rotation of said transfer wheel.

7. Apparatus for assembling fasteners, each having a shank, such as common nails and the like, with a carrier strip of general channel shape having pairs of slots, the slots of each pair being formed in the opposed legs to define a fastener carrying groove, said apparatus comprising:
   a transfer wheel provided with peripheral grooves for receiving the shank of a fastener;
   means driving said transfer wheel;
   chute means discharging at and extending generally radially of said transfer wheel for supplying fasteners to said transfer wheel wherein a fastener moves into each peripheral groove upon movement of said transfer wheel; and
   track means for guiding a carrier strip past said transfer wheel with the peripheral edge of said transfer wheel extending into the open channel of said carrier strip with each peripheral groove aligning with a fastener carrying groove of a carrier strip;
   said transfer wheel being provided with a circumferential groove in its periphery; and
   means extending into said circumferential groove thereby to eject any fasteners which do not transfer to the carrier strip.

8. Apparatus for coiling a strip of fasteners, each having a shank, such as common nails and the like, supported on a channel shaped carrier strip, each fastener being held transversely of the strip in opposed grooves in the flanges of the carrier strip, said apparatus comprising:
   a coiling mandrel for assembled strip having a plurality of peripheral grooves for receiving shanks of fasteners in a carrier strip;
   drive means for turning said mandrel;
   track means for threading assembled strip into tangential engagement with said mandrel whereby the shanks of the fasteners enter respective peripheral grooves;
   clamp means closable around said mandrel including jaws spring biased toward each other; and
   operating means for opening said jaws rendering the same ineffective.

9. Apparatus as set forth in claim 8 including cutting means for cutting a carrier strip.

10. Apparatus as set forth in claim 9 wherein said drive means includes a drive train having a slow and fast drive, and wherein clutch means render said slow drive effective following ejection of a bundle of fasteners from said winding mandrel.

11. Apparatus as set forth in claim 8 wherein said drive means overdrives said mandrel during a coiling operation, and wherein clutch means are provided to connect said drive means and said mandrel and to provide for slippage during overdrive thereof.

12. Apparatus as set forth in claim 8 including a pusher assembly for sliding a coiled strip from said mandrel.

13. Apparatus as set forth in claim 12 including a tube assembly positioned to receive a plurality of coiled strips ejected from said mandrel.

References Cited
UNITED STATES PATENTS

| | | | |
|---|---|---|---|
| 3,165,868 | 1/1965 | MacDonald et al. | 53—200 X |
| 3,303,632 | 2/1967 | Halstead | 53—140 |
| 3,421,284 | 1/1969 | Zemek | 53—200 X |

THERON E. CONDON, Primary Examiner

E. F. DESMOND, Assistant Examiner

U.S. Cl. X.R.

53—183, 196; 242—67.1; 206—56